Aug. 7, 1928.
E. O. SCHJOLIN
1,679,990
ENGINE MOUNTING
Filed June 13, 1927
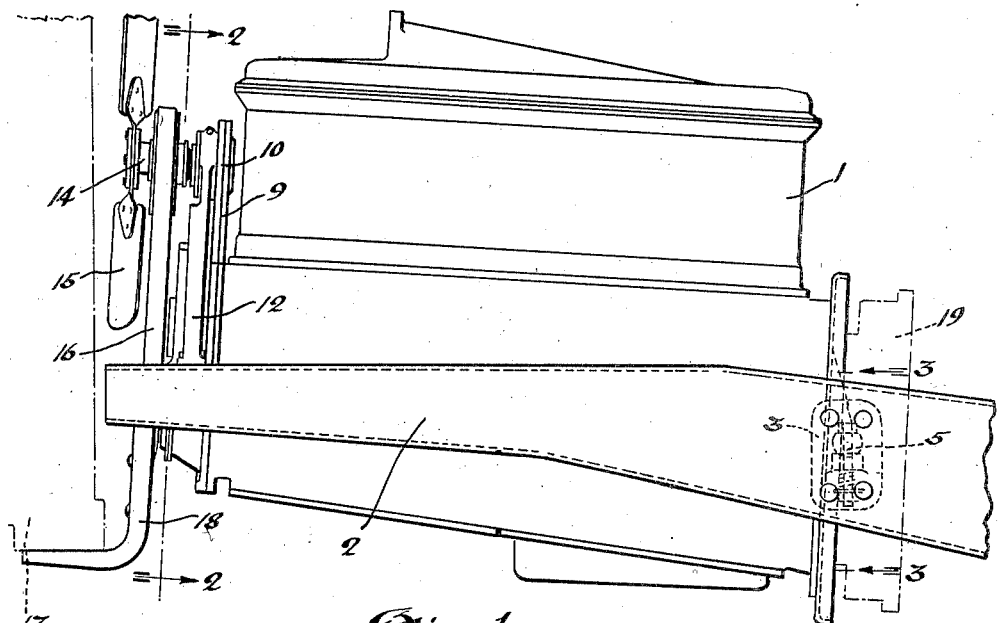
Fig. 1.
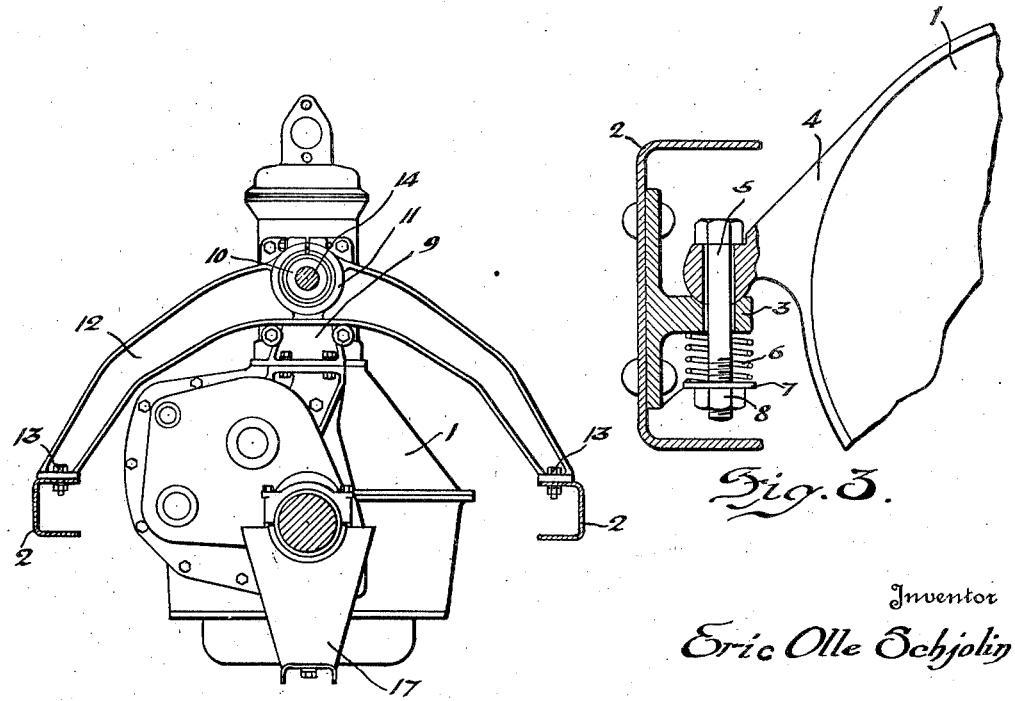
Fig. 2.
Fig. 3.
Inventor
Eric Olle Schjolin
By Blackmore, Spencer & Hulse
Attorneys Patented Aug. 7, 1928.

1,679,990

UNITED STATES PATENT OFFICE.

ERIC OLIE SCHJOLIN, OF BIRMINGHAM, MICHIGAN, ASSIGNOR TO GENERAL MOTORS CORPORATION, OF DETROIT, MICHIGAN, A CORPORATION OF DELAWARE.

ENGINE MOUNTING.

Application filed June 13, 1927. Serial No. 198,453.

This invention relates to motor vehicles and particularly to means for mounting an engine in the chassis frame of the vehicle, and involves a construction embodying the approved principle of three-point suspension. In this instance, the two side supports at the rear of the engine, are in the nature of universal connections, while the front of the engine is pivotally supported on a longitudinal axis by an arcuate cross member of the chassis frame. One of the important features is the arrangement of the front and rear supports in such manner that a line drawn through the respective axis of each will approach or intersect the center of gravity of the engine, whereby the engine is made more stable in the frame. At the same time, the cross member is such, that it possesses a certain small degree of resiliency, which is sufficient to absorb engine vibrations and prevent their transmission through the frame; eliminating vibratory noises and rattles; freeing the parts from damaging stress and obviating the necessity for frequent replacement of broken parts. A further advantage of the present construction, lies in the fact that upon weaving of the chassis frame members, the engine does not tilt with the weaving, but remains in a vertical position turning about the axis of the front support, without the imposition of undue strains on the engine and its associated parts.

Other advantages will be apparent from the following specification taken in connection with the accompanying drawing, in which:

Fig. 1 is a side elevation of an engine supported in the chassis frame in accordance with the present invention; Fig. 2 is an elevation at the front of the engine taken on line 2—2 of Fig. 1, and Fig. 3 is a detail view, partly in section, of the mounting employed at the rear of the engine and is taken on line 3—3 of Fig. 1.

Referring more particularly to the drawing, the numeral 1 indicates an engine of the internal combustion type supported between a pair of longitudinally extending channelled side frame members 2—2. At the rear of the engine, each side is attached to an adjacent frame member 2 by a universal connection, consisting of a bracket 3, carried within the channel of the frame member 2, and provided with a semi-spherical concavity on its upper face, in which is seated a semi-spherical ball portion of an arm or leg 4, extending laterally from the engine. A connecting bolt 5 projects through holes or openings in the bracket and arm respectively, the openings being of larger diameter than the bolt so as to afford a sloppy fit. A helical spring 6 is carried by and surrounds the bolt 5, bearing at opposite ends against the bottom of the bracket 3 and the washer or disc 7, held by the screw threaded nut 8 on the bolt 5. Adjustment of the nut 8 varies spring tension on the bolt, and the spring-pressed bolt serves to yieldingly maintain the motor arm on its seat, while permitting limited universal movement of the parts by reason of its loose fit.

The central front engine support is shown located about half way up on the cylinder block at a point which would be substantially on a line drawn forward from the rear supports, through the center of gravity of the engine. This support consists of an upwardly extending bracket 9, bolted or otherwise secured to the engine, and provided with a forwardly projecting trunnion member 10 bearing within a split collar 11, integrally formed at the central top portion of an arcuate cross bar or transverse arch 12, secured at either end by bolts 13, to the top of the chassis frame side members 2—2. The member 10 may also be utilized as a mounting for the shaft 14 of the radiator fan 15, which is driven by a suitable belt 16 off the engine crankshaft. The front of the engine is thus pivotally supported on a longitudinal axis and relative up and down movement on the side members 2—2 upon frame weaving, turns the cross member about the trunnion 10 without placing undue twisting strains on the engine. This arched frame member 12 is preferably made of high grade steel or other metal possessing a slight degree of flexibility, which may yield sufficiently to dampen inherent vibratory reactions during engine operation.

In view of the fact that the engine is freed from the effects of frame weaving and in order that the radiator structure and its rubber hosing connections with the engine may be similarly undisturbed, it is proposed to mount the cooling radiator 17 on a forwardly projecting bracket 18 carried at the front of the engine. The weight of the radiator forward of the front support, is counterbalanced by the weight of the engine flywheel 19, located beyond the rear supports. It may be stated that in the particular case illustrated, the transmission drive mechanism is not connected directly with the engine flywheel, as is the general practice, but is a separate unit driven by means of a jack shaft and independently supported on the frame. Thus it was not necessary to consider the gravity weight of the transmission in the determination of the proper location for the mountings. For this reason the center of gravity is somewhat farther forward than in the usual engine assembly and is found to be substantially midway between the front and rear of the engine. It will be apparent, therefore, that a straight line extending between front and rear mountings will approach or intersect this center of gravity. While the invention has been described more or less specifically, it is to be understood that it is not limited to exact details shown, but that such modifications may be made as come within the scope of the appended claims.

I claim:

1. In a motor vehicle, the combination with a pair of spaced chassis frame members and an engine to be supported thereon, of connections between said frame and the front and rear of the engine on a line intersecting the approximate center of gravity of the engine, an engine flywheel located beyond the rear connection, and an engine radiator located beyond the front connection to counterbalance the weight of said flywheel and maintain the stability of the engine in said supporting frame.

2. In a motor vehicle, the combination of a pair of spaced chassis frame members, a transverse member connecting said members, an engine supported between said spaced members and having its forward end pivotally mounted on said transverse member and its rearward end mounted at opposite sides to the adjacent chassis frame member for universal movement, each universal mounting including a bracket carried by the frame member and having a semi-spherical concavity, a semi-spherical portion on the engine seating within the concavity, a retaining bolt fitting loosely within openings in said spherical portion and the bracket and a resilient spring acting on said bolt to maintain the semi-spherical portion on its seat.

In testimony whereof I affix my signature.

ERIC OLIE SCHJOLIN.